US011106556B2

(12) United States Patent
Koning et al.

(10) Patent No.: US 11,106,556 B2
(45) Date of Patent: Aug. 31, 2021

(54) DATA SERVICE FAILOVER IN SHARED STORAGE CLUSTERS

(71) Applicant: EMC IP Holding Company LLC, Hopkinton, MA (US)

(72) Inventors: G. Paul Koning, New Boston, NH (US); Himabindu Tummala, South Grafton, MA (US); Sudhir Srinivasan, Acton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 55 days.

(21) Appl. No.: 16/570,974

(22) Filed: Sep. 13, 2019

(65) Prior Publication Data

US 2021/0081287 A1    Mar. 18, 2021

(51) Int. Cl.
*G06F 11/20*    (2006.01)
*H04L 29/08*    (2006.01)
*H04L 12/24*    (2006.01)
*H04L 12/26*    (2006.01)

(52) U.S. Cl.
CPC ...... *G06F 11/2094* (2013.01); *H04L 41/0654* (2013.01); *H04L 67/1097* (2013.01); *G06F 2201/85* (2013.01); *H04L 43/10* (2013.01)

(58) Field of Classification Search
CPC ............. G06F 11/2094; G06F 2201/85; H04L 41/0654; H04L 67/1097; H04L 43/10
USPC ........................................................ 714/6.3
See application file for complete search history.

(56) References Cited

U.S. PATENT DOCUMENTS

2016/0004610 A1* 1/2016 Knight ................ G06F 11/2023
714/4.11
2019/0108099 A1* 4/2019 Mazumdar ............ G06F 16/188

* cited by examiner

*Primary Examiner* — Yair Leibovich
(74) *Attorney, Agent, or Firm* — Amin, Turocy & Watson, LLP

(57) ABSTRACT

Described herein is a system that provides data service failover in shared storage clusters. An example shared storage cluster can include multiple data node devices equipped to access to a shared storage location. Each of the data node devices can host multiple network attached storage (NAS) servers. For each NAS server at a data node device, a different data node device in the shared storage cluster can be designated as a backup node. The designated backup nodes for NAS servers at any one data node device in the shared storage cluster can be distributed across multiple other data node devices in the shared storage cluster, thereby sharing the burden of data node device failure across multiple other data node devices.

20 Claims, 10 Drawing Sheets

DATA SERVICE FAILOVER IN SHARED STORAGE CLUSTERS

TECHNICAL FIELD

The subject disclosure relates generally to electronic data storage systems.

BACKGROUND

The large increase in the amount of data generated by digital systems has created a new set of challenges for data storage environments. Traditional storage area network (SAN) and/or network-attached storage (NAS) architectures were not designed to support data storage and protection at large multi-petabyte capacity levels. Object storage technology can be utilized to meet these requirements. By utilizing object storage technology, organizations can not only keep up with rising capacity levels but can also store these new capacity levels at a manageable cost point.

Modern data storage techniques can store data in arrays of data storage devices. As an example, data can be stored in an ECS™ (formerly known as ELASTIC CLOUD STORAGE) system, such as is provided by DELL EMC. Such systems can comprise clusters of data storage nodes. The operation of a cluster can be overseen by a manager. In the event of failure of the manager, or failure of a data storage node, restoration of the failed manager or failed data storage node should be as fast and seamless as possible to minimize disruption.

The above-described background is merely intended to provide a contextual overview of some current issues and is not intended to be exhaustive. Other contextual information may become further apparent upon review of the following detailed description.

DETAILED DESCRIPTION

Figure 1:
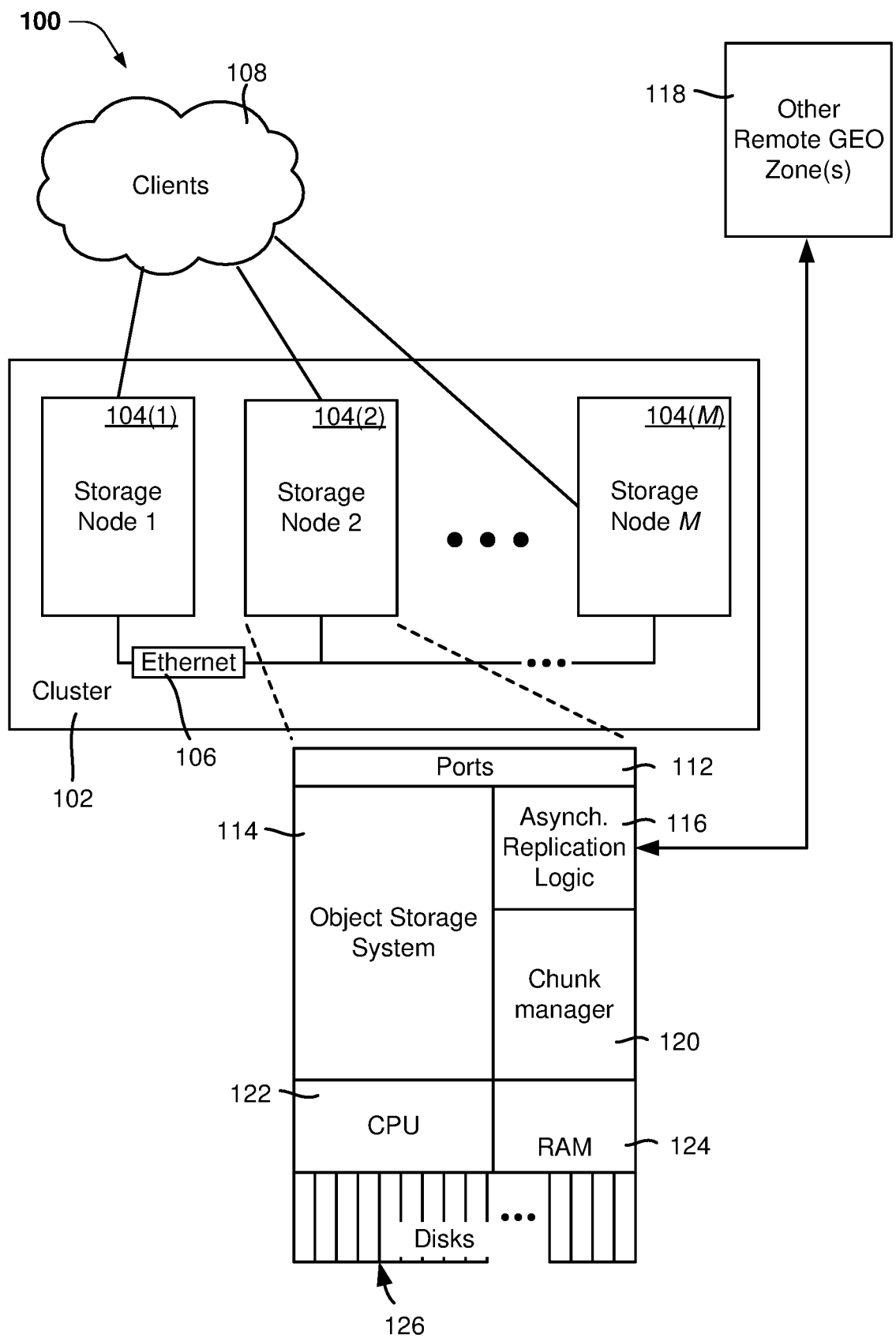
FIG. 1 illustrates an example part of a cloud data storage system, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to data service failover in shared storage clusters. An example shared storage cluster can include multiple data node devices equipped to access to a shared storage location. Each of the data node devices can host multiple network attached storage (NAS) servers. For each NAS server at a data node device, a different data node device in the shared storage cluster can be designated as a backup node. Furthermore, the designated backup nodes for NAS servers at any one data node device in the shared storage cluster can be distributed across multiple other data node devices in the shared storage cluster, thereby sharing the burden of data node device failure across multiple backup nodes.

Backup nodes can be prepared in advance to start NAS servers from failed data node devices, such as by attaching backup nodes to the shared storage location while backup nodes remain in backup node status. Data node devices can also monitor the health of other data node devices, e.g., by monitoring "heartbeat" communications. In the event of a data node device failure, the backup nodes distributed among other data node devices in the shared storage cluster can discover the failure, and the backup nodes can start those NAS servers from the failed data node device for which they served as backup node. By decentralizing and distributing failover operations according to this disclosure, failover can be accomplished at high speed and with high reliability.

Example systems and methods disclosed herein, in one or more embodiments, relate to cloud storage systems, such as, but not limited to an ECS™ platform. The ECS™ platform combines the cost advantages of commodity infrastructure with the reliability, availability and serviceability of traditional arrays.

With regard to the ECS™ platform in general, ECS™ can comprise clusters of nodes that deliver scalable public cloud services with the reliability and/or control of a private-cloud infrastructure. Moreover, the ECS™ platform comprises a scale-out, shared-nothing object storage, which employs a microservices architecture pattern. The ECS™ platform can support storage, manipulation, and/or analysis of unstructured data on a massive scale. As an example, ECS™ can support mobile, cloud, big data, content-sharing, and/or social networking applications. ECS™ can be deployed as a turnkey storage appliance or as a software product that can be installed on a set of qualified servers and/or disks.

The ECS™ scale-out and geo-distributed architecture is a cloud platform that can provide the following example features: (i) lower cost than public clouds; (ii) unmatched combination of storage efficiency and data access; (iii) anywhere read/write access with strong consistency that simplifies application development; (iv) no single point of failure to increase availability and performance; and (v) universal accessibility that eliminates storage silos and inefficient extract, transform, load (ETL)/data movement processes; etc.

In an aspect, ECS™ need not rely on a file system for disk capacity management. Instead, ECS™ can partition disk space into a set of blocks of fixed size called chunks (e.g., having a chunk size of 128 MB). User data can be stored in these chunks and the chunks can be shared. Typically, a chunk can comprise fragments of several different user objects. The chunk content can be modified in an append-only mode. When a chunk becomes full, it can be sealed and the content of a sealed chunk is immutable. In a further aspect, a data chunk can comprise a plurality of object segments having a size of 2 MB that are appended in the data chunk. Thus, a data chunk of size 128 MB can have 64 object segments appended together. In general operation, a read request comprises a request to read (e.g., extract) a single object segment.

In another aspect, ECS™ provides a cloud storage system that supports geographically distributed setups comprising two or more zones. Each zone can include a cluster of multiple data node devices which are administered by a cluster controller. The corresponding feature is called GEO. GEO can be used to provide additional protection of user data by means of replication. The replication mechanism can work at the chunks level, although it can also serve object-oriented goals. In an aspect, a chunk with data can be replicated to multiple remote zones. ECS™ can use GEO erasure coding techniques to minimize capacity overhead associated with GEO data protection. Although the systems and methods disclosed herein may be described with respect to object storage systems, the subject specification is not limited to object storage systems and can be utilized for most any storage systems.

The GEO system is capable of employing, e.g., a replication to single site mode, a replication to all sites mode, or a replication to one or more regions mode depending on geographical considerations (e.g., distance and government rules on storing data), site or region storage size considerations (e.g., a site limited to storing 100 million data chunks). A replication to one site mode comprises replicating a backup copy of a data chunk at a single zone. For example, the data chunk is created at a primary zone and a backup is stored at secondary zone. A replication to all sites mode comprises replicating a backup copy of a data chunk at every zone within the GEO system. A replication to one or more regions mode can comprise replicating a data chunk to one or more regions. The data chunk can be replicated at, e.g., a single respective zone of each of multiple respective regions. The advantage of replicating at region level is that it provides greater reliability of accessing the data chunk during zone failure while storing the data chunks at fewer zones, thereby reducing storage resources. In some embodiments, chunks containing data associated with a particular application can be replicated in order to replicate the corresponding objects of the application.

ECS™ supports temporary unavailability of GEO zones. When a zone is temporarily unavailable we say that the zone is in temporary site outage (TSO) mode. Support for TSOs can be accomplished in part through object management. Geographically distributed ECS™ setups maintain a global namespace and assure strong consistency for user data. This is achieved via defining a primary zone for each object. Normally, the primary zone is a zone that created an object. Then, we say that the primary zone owns the object or that the primary zone is the owner of the object. All requests related to the object can be handled by the zone that owns it.

When a zone that owns some object enters TSO mode, a new owner zone can be elected for the object. Note that every available zone of the GEO setup can become the owner. In the general case, a new object owner can facilitate update of the object. This means a potential conflict after the original owner of the object becomes available again. The system runs through a reconciliation phase to resolve conflicts. The ECS's conflict resolution strategy is very simple: choose a latest object update and discard potentially conflicting object updates.

FIG. 1 shows part of a cloud data storage system such as ECS™ comprising a cluster 102 of data node devices, referred to in FIG. 1 as storage nodes 104(1), 104(2) . . . 104(M). Each storage node 104(1), 104(2) . . . 104(M) can comprise a computing device equipped to host multiple virtual machines (not shown in FIG. 1), which may be referred to herein as network attached storage (NAS) servers. The NAS servers can be configured to serve objects in response to requests from clients 108. Furthermore, typically one of the nodes 104(1), 104(2) . . . 104(M) can host a cluster controller virtual machine (not shown in FIG. 1), making that node the cluster controller node which administers the cluster 102. The nodes 104(1), 104(2) . . . 104(M) can be coupled to each other via a suitable data communications link comprising interfaces and protocols such as, but not limited to, Ethernet block 106.

Clients 108 can send data system-related requests to the cluster 102, which in general can be configured as one large object namespace. There can be on the order of billions of objects maintained in a cluster 102. To this end, a node such as the node 104(2) generally comprises ports 112 by which clients 108 connect to the cloud storage system. Example ports 112 are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), can include an instance of an object storage system 114 and data services. In general, and in one or more implementations, e.g., ECS™, disk space can be partitioned into a set of large blocks of fixed size called chunks and user data can be stored in chunks. Chunks are shared, that is, one chunk can contain segments of multiple user objects; e.g., one chunk can contain mixed segments of some number of (e.g., three) user objects. A chunk manager 120 can be utilized to manage the chunks and their protection.

Each node, such as the node 104(2), can include a CPU 122, RAM 124, and storage devices such as disks 126. RAM 124 and disks 126 can comprise, e.g., volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

For a cluster that comprises a "GEO" zone of a geographically distributed storage system, at least one node, such as the node 104(2), can include or be coupled to reference tracking asynchronous replication logic 116 that synchronizes the cluster 102 with other remote GEO zones, such as 118.

Figure 2:
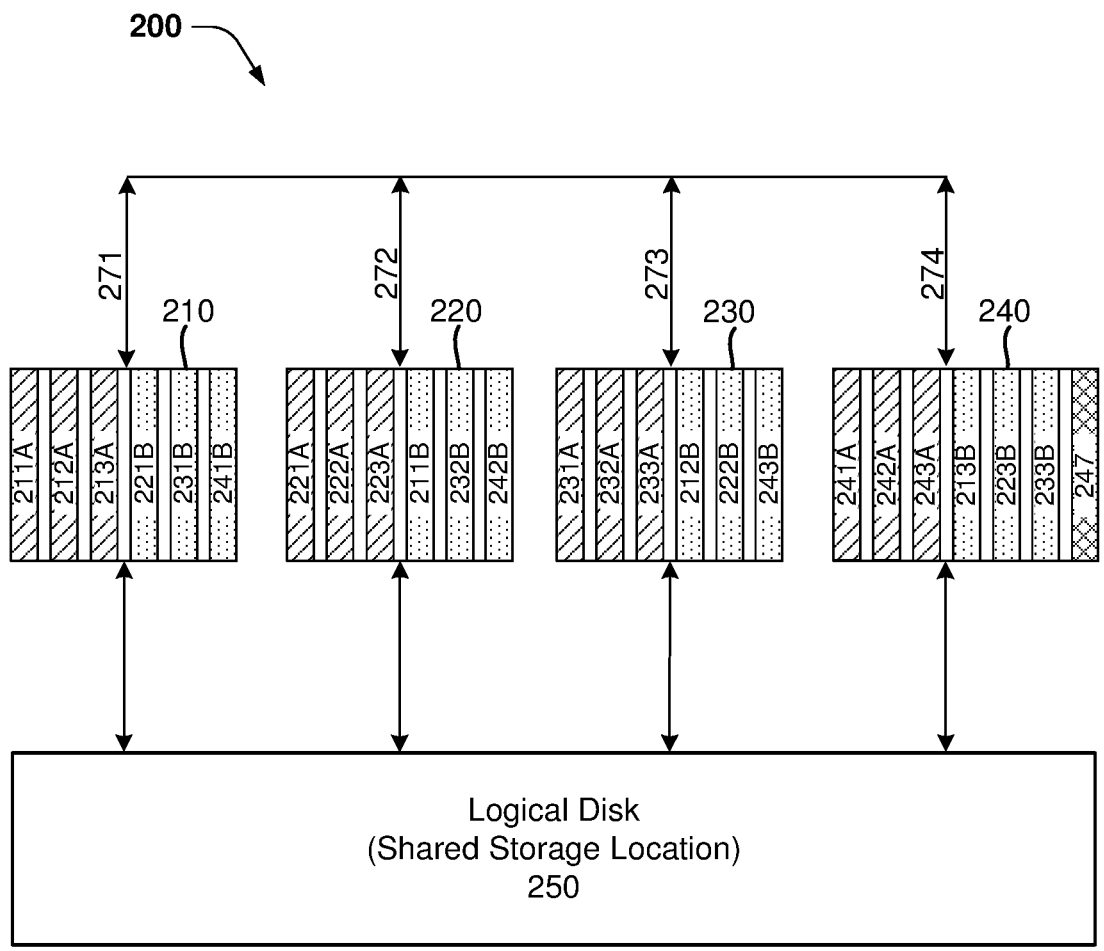
FIG. 2 illustrates an example storage cluster comprising data node devices and a shared storage location, in accordance with one or more embodiments described herein.

FIG. 2 illustrates an example storage cluster comprising data node devices and a shared storage location, in accordance with one or more embodiments described herein. The example storage cluster 200 includes data node devices 210, 220, 230, and 240, and logical disk 250. Data node devices 210, 220, 230, and 240 may be referred to herein as "nodes". Each of the illustrated nodes 210, 220, 230, 240 can comprise, e.g., an instance of a storage node such as illustrated in FIG. 1. Each of the illustrated nodes 210, 220, 230, 240 can host one or more NAS servers as shown. Logical disk 250 can comprise a shared storage location accessible by nodes 210, 220, 230, and 240.

In the illustrated example, NAS servers 211A, 212A, and 213A have been assigned, by to run at node 210. The assignments of NAS servers 211A, 212A, and 213A run at node 210 are active node assignments. Node 210 may therefore be referred to herein as the "active" or "current" node for NAS servers 211A, 212A, and 213A. Backup node assignments 211B, 212B, and 213B have been assigned to nodes 220, 230, and 240, respectively, to designate nodes 220, 230, and 240, respectively, as backup nodes for NAS servers 211A, 212A, and 213A. Nodes 220, 230, and 240, respectively, may therefore be referred to herein as backup nodes for NAS servers 211A, 212A, and 213A, respectively. As illustrated in FIG. 2, node 210 is also a backup node for NAS servers 221A, 231A, and 241A, in view of backup node assignments 221B, 231B, and 241B at node 210.

Nodes 220, 230, and 240 also serve as active nodes for some NAS servers. Node 220 is an active node for NAS servers 221A, 222A, and 223A and also comprises backup node assignments 211B, 232B, and 242B. Node 230 is an active node for NAS servers 231A, 232A, and 233A and also comprises backup node assignments 212B, 222B, and 243B. Node 240 is an active node for NAS servers 241A, 242A, and 243A and also comprises backup node assignments 213B, 223B, and 233B. Node 240 also hosts a cluster controller 247, which administers the cluster 200 and the shared storage location 250.

As seen in FIG. 2, the backup node assignments corresponding to the NAS servers at any given node can be distributed among other nodes. For example, backup node assignments 211B, 212B, and 213B, which correspond to NAS servers 211A, 212A, and 213A hosted at node 210, are distributed among multiple nodes 220, 230, and 240. Similarly, the backup node assignments for NAS servers 221A, 222A, and 223A, namely, backup node assignments 221B, 222B, and 223B are distributed among multiple nodes 210, 230, and 240. The backup node assignments for NAS servers 231A, 232A, and 233A are distributed among multiple nodes 210, 220, and 240. The backup node assignments for NAS servers 241A, 242A, and 243A are distributed among multiple nodes 210, 220, and 230.

In an aspect, the distribution of active node and backup node assignments can be controlled by the cluster controller 247 as described herein. Of course, the number of nodes, the number of NAS servers, and the distribution of active node and backup node assignments can be other than illustrated in FIG. 2. FIG. 2 illustrates equal distributions of both active node assignments and backup node assignments, which need not be true for all embodiments.

In a further aspect, a heartbeat protocol may be followed by the nodes 210, 220, 230, and 240. In an example heartbeat protocol, a node, e.g., node 210, can periodically send a notification 271 to the other nodes 220, 230, and 240. The notification 271 proves that node 210 remains operational and connected to the storage cluster 200. In the event of a delay of notification 271, any of the other nodes 220, 230, and 240, e.g., node 220, can initiate a failover, for example by performing one or more fencing operations to fence off the node 210, and starting NAS server 211A (for which node 220 served as backup node). FIG. 2 illustrates example heartbeat notifications 271, 272, 273, and 274, comprising notifications from nodes 210, 220, 230, and 240, respectively, to each of the other nodes in the storage cluster 200.

In another aspect, backup nodes can perform certain operations to prepare for failover in advance. In the event of a failure of an example NAS server 211A, the backup node 220 can start NAS server 211A at backup node 220. Preparation operations may generally comprise any operations to facilitate starting NAS server 211A at backup node 220 which can be accomplished without disrupting operation of the storage cluster 200. For example, backup node 220 can discover the shared storage in logical disk 250, or portions thereof used by NAS server 211A, backup node 220 can open storage devices associated with logical disk 250, and backup node 220 can allocate buffers for logical disk 250. Any of the above operations is considered herein to comprise "attaching" the backup node 220 to the logical disk/shared storage location 250. The arrows between the nodes 210, 220, 230, and 240 and the logical disk/shared storage location 250 illustrated in FIG. 2 indicate, in part, that the backup nodes are attached to the logical disk 250.

Operations that can be omitted from backup node preparation operations, in some embodiments, include mounting a filesystem for the logical disk 250 and turning on an IP address that can log the backup node (e.g., node 220) as the location of the NAS server (e.g., NAS server 211A). Therefore in some embodiments, starting a NAS server 211A by a backup node 220 can comprise operations including mounting a filesystem for the logical disk 250 at backup node 220 and turning on an IP address that logs the backup node 220 as the location of the NAS server 211A.

Figure 3:
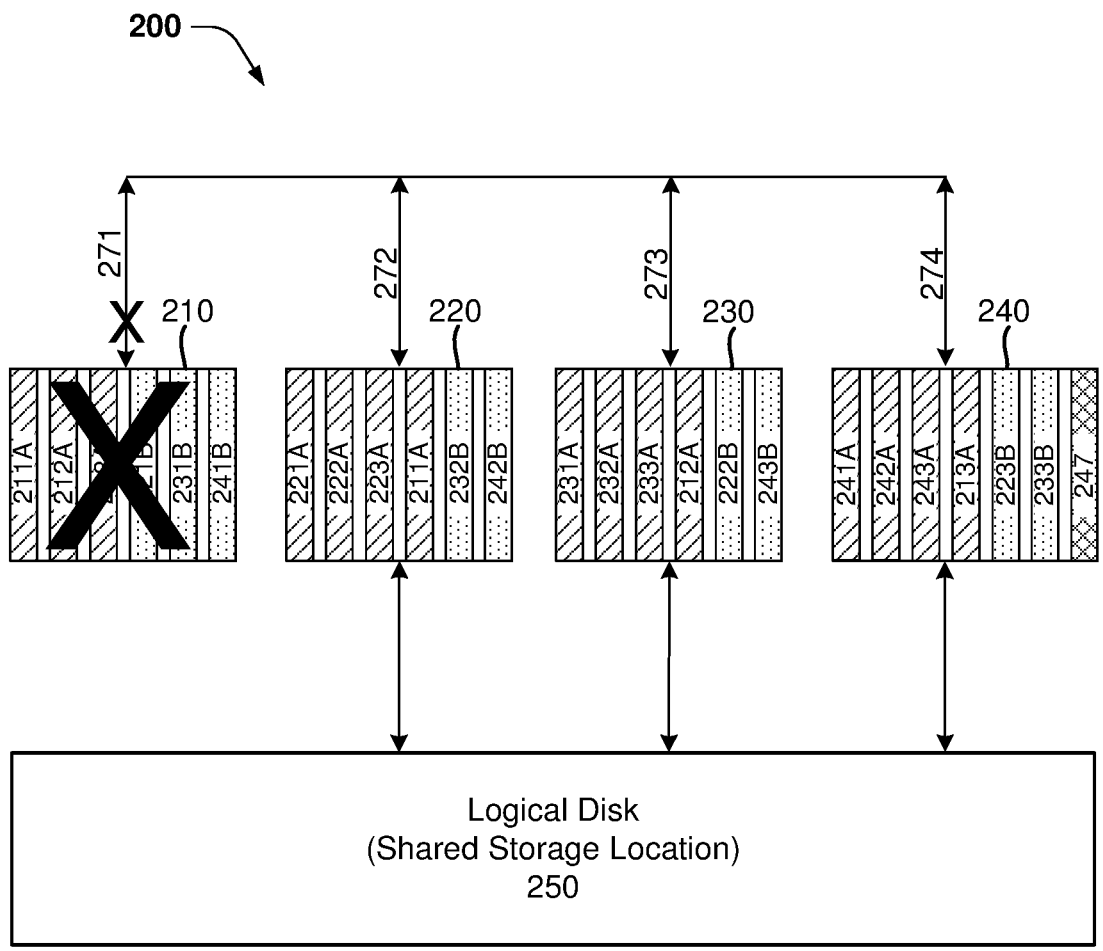
FIG. 3 illustrates the example storage cluster of FIG. 2 after failure of a data node device, in accordance with one or more embodiments described herein.

FIG. 3 illustrates the example storage cluster of FIG. 2 after failure of a node, in accordance with one or more embodiments described herein. The storage cluster 200 in the state illustrated in FIG. 3 includes many of the elements of FIG. 2, including nodes 210, 220, 230, and 240, the NAS servers and backup node assignments illustrated in FIG. 2, and logical disk 250. However, an X over node 210 indicates that node 210 has failed, and as a result, heartbeat notifications 271 have stopped.

In response to a delay of heartbeat notifications 271, one or more of the other nodes 220, 230, and/or 240 can perform a fencing operation to fence off the failed node 210, as described herein. Furthermore, each of the nodes which serve as a backup node for NAS servers 211A, 212A, 213A at the failed node 210 can start NAS servers according to its backup node assignments. In further response to the failure of node 210, the cluster controller 247 can perform operations including restarting the failed node 210, and distributing the backup node assignments that were previously assigned to the failed node 210. The cluster controller 247 can distribute backup node assignments 221B, 231B, and 241B, among the remaining, non-failed nodes 220, 230 and 240.

Figure 4:
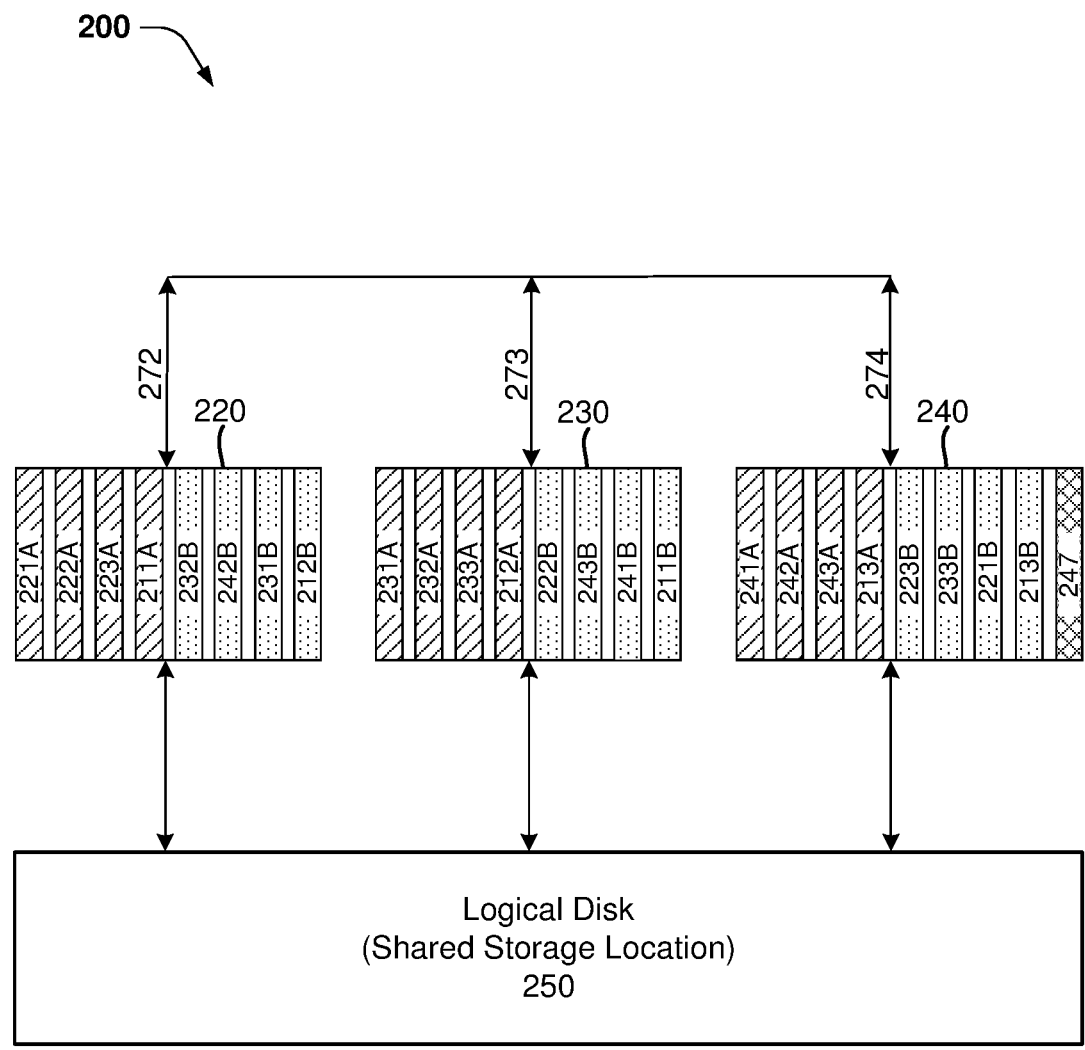
FIG. 4 illustrates the example storage cluster of FIG. 3 after starting NAS servers pursuant to backup node assignments, in accordance with one or more embodiments described herein.

FIG. 4 illustrates the example storage cluster of FIG. 3 after starting NAS servers pursuant to backup node assignments, in accordance with one or more embodiments described herein. The storage cluster 200 in the state illustrated in FIG. 4 includes many of the elements of FIG. 3, including nodes 220, 230, and 240, some of the active and backup node assignments illustrated in FIG. 2, and logical disk 250. However, failed node 210 is removed from FIG. 4 and the NAS servers previously hosted at node 210 have been started at other nodes 220, 230, and 240. Furthermore backup node assignments previously at node 210 have been distributed among other nodes 220, 230, and 240.

In FIG. 4, NAS servers 211A, 212A, and 213A at nodes 220, 230, and 240 comprise NAS servers that started pursuant to backup node assignments 211B, 212B, and 213B, as shown in FIG. 3. Furthermore, the cluster controller 247 has distributed new backup node assignments 211B, 212B, and 213B for each of the NAS servers 211A, 212A, and 213A. New backup node assignment 211B is at node 230, new backup node assignment 212B is at node 220, and new backup node assignment 213B is at node 240.

The failure of the node 210 furthermore affected the backup node assignments 221B, 231B, and 241B that were at node 210, as shown in FIG. 2 and FIG. 3. In FIG. 4, the cluster controller 247 has distributed new backup node assignments 221B, 231B, and 241B among the remaining, non-failed nodes 220, 230, and 240 in the storage cluster 200. Backup node assignment 221B is moved to node 240, backup node assignment 231B is moved to node 220, and backup node assignment 241B is moved to node 230. Embodiments can, but need not necessarily distribute backup node assignments from a failed node 210 equally among remaining nodes, as illustrated in FIG. 4.

If node 210 can be restarted, then after restarting node 210, the cluster controller 247 can reassign NAS servers and backup node assignments to the restarted node 210. Such a reassignment to make use of a new node (the restarted node 210) can, but need not necessarily, result in a same NAS server distribution as existed prior to failure of the node 210. For example, one possible distribution of NAS server and backup node assignments, after restart of the node 210, can be the distribution illustrated in FIG. 2.

Figure 5:
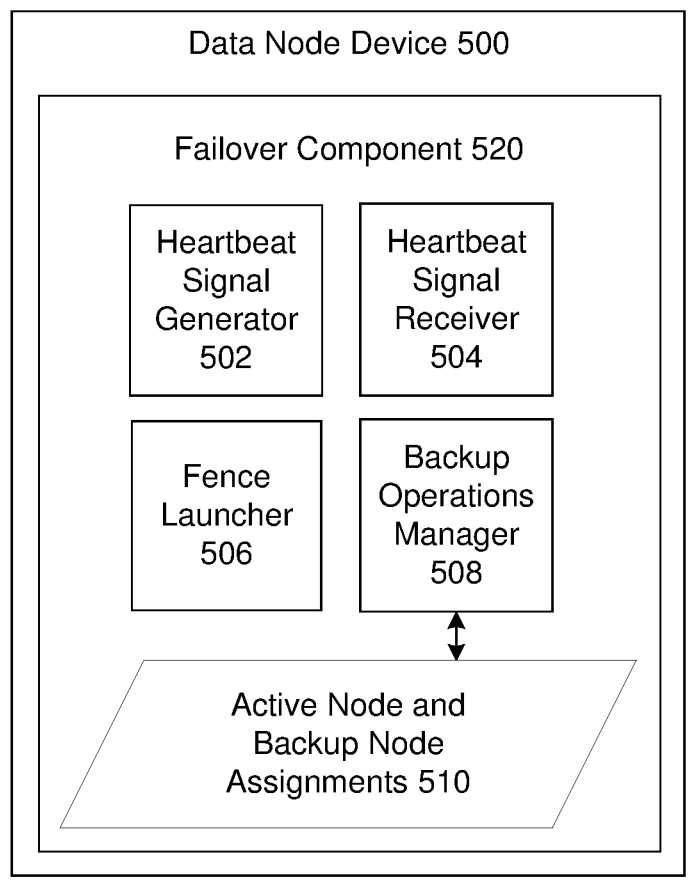
FIG. 5 illustrates an example failover component in a data node device, in accordance with one or more embodiments described herein.

FIG. 5 illustrates an example failover component in a data node device, in accordance with one or more embodiments described herein. FIG. 5 includes representative data node device 500, which is representative of any of nodes 210, 220, 230, 240. Node 500 includes an example failover component 520, which can include a heartbeat signal generator 502, a heartbeat signal receiver 504, a fence launcher 506, a backup mode manager 508, and active node and backup node assignments 510.

Figure 6:
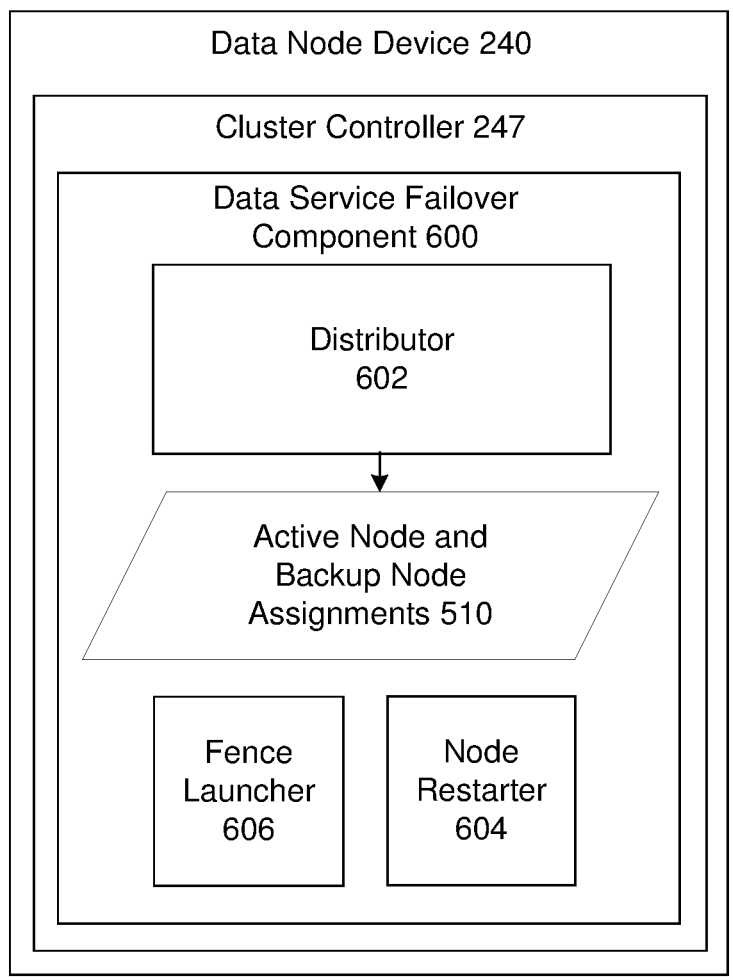
FIG. 6 illustrates an example data service failover component in a cluster controller, in accordance with one or more embodiments described herein.

In an example embodiment, active node and backup node assignments 510 can be maintained and distributed to nodes by the cluster controller 247, as described further with reference to FIG. 6. Active node and backup node assignments 510 can comprise a list of nodes in the storage cluster 200, a list of NAS servers assigned to each node, and a list of backup node assignments for each node.

While not illustrated in FIG. 5, node 500 can also comprise any NAS servers assigned to execute at node 500. Furthermore, node 500 can optionally host a cluster controller when node 500 is selected to do so by other data nodes in the storage cluster 200.

In an example, heartbeat signal generator 502 can be operable to send heartbeat notifications the other nodes in the storage cluster. Heartbeat signal receiver 504 can be operable to receive heartbeat notifications from the other nodes in the storage cluster.

Example operations of backup operations manager 508 include receiving updated active node and backup node assignments 510 from a cluster controller. Furthermore, backup operations manager 508 can prepare node 500 for failover of the NAS servers for which node 500 is designated as a backup node. Backup operations manager 508 can monitor heartbeat signals received at heartbeat signal receiver 504, and in response to a delay of heartbeat notifications from another node in the storage cluster, backup node manager 508 can initiate fence launcher 506 to fence the failed node from accessing logical disk 250. In further response to a delay of heartbeat notifications from another node in the storage cluster, backup operations manager 508 can start any NAS servers assigned to the failed node and for which node 500 is designated as backup node in active node and backup node assignments 510.

FIG. 6 illustrates an example data service failover component in a cluster controller, in accordance with one or more embodiments described herein. FIG. 6 includes node 240 and cluster controller 247, introduced in FIGS. 2-4. Cluster controller 247 includes an example data service failover component 600, which can include distributor 602, active node and backup node assignments 510, a node restarter 604, and a fence launcher 606.

In some embodiments, nodes in a storage cluster can be configured as peer devices, any of which can host the cluster controller 247. The aspects of cluster controller 247 illustrated in FIG. 6 can therefore be implemented in addition to elements of failover component 520, since failover component 520 can also be included at node 240.

In an example, distributor 602 can determine distributions of active node and backup node assignments for the storage cluster 200, and distributor 602 can update active node and backup node assignments 510 to reflect determined distributions. Distributor 602, or some other component of the cluster controller 247, can send updated active node and backup node assignments 510 out to the nodes in the storage cluster 200.

In general, distributor 602 can distribute, across multiple backup nodes, the backup node assignments corresponding to active node assignments to any individual active node. By distributing backup node assignments across multiple backup nodes, the burden of failover operations responsive to node failure is distributed across the multiple backup nodes. Furthermore, failover operations can proceed without oversight of the cluster controller.

Some embodiments can distribute, by the cluster controller, multiple NAS server assignments among multiple data node devices in the cluster of data node devices, and can distribute, by the cluster controller, multiple backup node assignments among the multiple data node devices, wherein respective backup node assignments of the multiple backup node assignments correspond to respective NAS server assignments of the multiple NAS server assignments. Two or more of the multiple backup node assignments distributed by the cluster controller can be assigned to different data node devices of the multiple data node devices, and the two or more backup node assignments can correspond to NAS server assignments which designate a single data node device of the multiple data node devices.

Distributor 602 can furthermore redistribute active node and passive node assignments after node failure. In response to a failure of a node, e.g., the failure of node 210 illustrated in FIG. 3, distributor 602 can for example redistribute backup node assignments from the failed node. For example, backup node assignments 221B, 231B, and 241B, can be redistributed to the remaining nodes 220, 230, 240 in the cluster 200, as illustrated in FIG. 4.

In a further aspect, distributor 602 can update active node and backup node assignments 510 to reflect that the nodes previously designated as backup nodes (for NAS servers of the failed node) have started the NAS servers of the failed node and are therefore to be recorded as active nodes rather than backup nodes in active node and backup node assignments 510.

In another aspect, distributor 602 can update active node and backup node assignments 510 to provide new backup node assignments for NAS servers of the failed node. For example, as illustrated in FIG. 4, NAS server 212A is started at node 230, and a new backup node assignment 212B has designated node 220 as the backup node for NAS server 212A.

In yet another aspect, distributor 602 can distribute NAS servers and backup node assignments to new nodes or restarted nodes in the storage cluster 200, such as by restoring cluster 200 from the state illustrated in FIG. 4 to the state illustrated in FIG. 2. By sending updated active node and backup node assignments 510 to the other nodes, cluster controller 247 can trigger moves of NAS servers and backup node assignments in order to leverage resources of a new or restarted node in the storage cluster 200.

Node restarter 604 can restart a node, e.g., failed node 210 illustrated in FIG. 3, after failure thereof. Fence launcher 606 can fence a failed node, e.g., failed node 210 illustrated in FIG. 3, from the storage cluster 200 as described herein.

An example detailed embodiment will now be described. The following terminology is applicable to the detailed embodiment.

NASLib—the library for NAS. Can be used for both NAS cluster manager and for a NAS data node.

SDNAS—Software Defined NAS. This includes the entire infrastructure for deploying NAS in a hardware independent environment.

Cluster Node—the node in the cluster currently elected to provide the cluster controller functions.

Cluster Controller—the set of algorithms that perform overall central control of the cluster; these algorithms are intended to run at one place within the cluster rather than being distributed algorithms.

VDM—a unit of execution and state within a node, e.g., a virtual machine.

System VDM—the control component of a node.

Data VDM—a NAS data service component of a node, also referred to herein as a NAS server.

Cluster VDM—the point of execution of the cluster controller function. The cluster VDM is active in the elected cluster node.

Cluster LUN—a block storage logical unit number (LUN) of a logical disk which contains the root file system of the cluster VDM, in which cluster configuration information and persistent state is stored and maintained by the cluster VDM.

Heartbeat—a communication mechanism that allows one or more nodes to confirm that another node is still operational.

Fencing—a mechanism to prevent access to storage or other non-shareable resources by the node that had been judged to have failed, to allow another node to take over safely in its place.

In various previous storage cluster arrangements, recovery from failure of a node involved four entities: (1) a cluster node which recognized failures and then orchestrated the failover process, (2) a centralized controller such as a VMWARE® vCenter or equivalent, which was told to detach each of the LUNs from a failed node and attach them to a new node, (3) a Linux kernel on the new node, and (4) a SDNAS process on the new node.

These previous arrangements created several concerns. First, if the cluster node functionality were to be merged into one of the data nodes, then when that particular data node failed, two recoveries would have to run serially: failover of the cluster node, followed by the new cluster node orchestrating the failover of the data services of the failed data node. Second, failover was too slow for large configurations.

In contrast, solutions according to this disclosure can take a distributed approach to data node failover. To do this, each data VDM can have a "backup node" assigned to it by the cluster controller. The job of the backup node can be to monitor the health of the data VDM, and if the data node where the data VDM currently runs has failed, the backup node can take over operation for the data VDM. The LUNs involved can be attached and discovered by the backup node ahead of time, so the recovery can comprise a limited set of operations, such as startup of the data VDM in the backup node and the re-establishment of the client connections to the data VDM.

In the example detailed embodiment, new data structures, protocols and algorithms can be used to deliver full storage cluster fault tolerance. An SDNAS storage cluster, such as storage cluster 200 can have the following example components: one or more nodes, e.g., nodes 210, 220, 230, and 240, each containing a system VDM started as part of node startup, and zero or more data VDMs. Furthermore, one of the nodes (the cluster node) can contain a cluster VDM.

The new data structures, algorithms and protocols can include, e.g. the following: First, a node heartbeat protocol can be implemented, which can run on a full mesh of connections among many or all of the currently configured nodes in the storage cluster. The heartbeat protocol can send messages periodically and monitor the arrival of those messages. Failure to receive the expected messages for a timeout period, or failure of the underlying connection, can be understood as an indication that the non-communicating node may be down. The non-communicating node can be declared down if an attempt to reconnect fails after the timeout or disconnect. The heartbeat messages can be sent periodically, e.g., every second. An example heartbeat timeout period can comprise, e.g., five seconds, which allows three seconds to allow for lost or retransmitted heartbeat messages, plus two seconds for network fault tolerance interruption time. Note that this assumes a network with rapid recovery from network faults, using a properly configured rapid spanning tree protocol (RSTP) switch configuration.

Secondly, the new data structures, algorithms and protocols can include a state change notification mechanism to notify SDNAS components about node state changes. The data VDM failover function can include such a state change notification mechanism. Thirdly, the new data structures, algorithms and protocols can include identifications of nodes by node identifiers, and connections between nodes in the storage cluster.

Node failure produces a service interruption as seen by the NAS clients 108, and there are time bounds on how long that interruption can be before client applications fail or I/O operations are completed with error status. Data service failover according to this disclosure should therefore limit the service interruption seen by clients 108 to be short enough that clients 108 see a stall, not errors. This fault tolerance should preferably be delivered consistently, e.g., the time limit can be considered an upper bound, not a "typical" value. Furthermore, fault tolerance should be delivered at worst case system scale, and it should be delivered under high I/O load.

Failure of a node can be handled by activating each of its data VDMs on another node, called the "backup node". In a cluster with more than two nodes, the backup roles for VDMs on a given node can be spread over the other nodes, resulting in rough load balancing. At any time, when appropriate, the cluster controller can perform load balancing to more accurately balance the data VDM workload in the cluster.

As part of starting a data VDM, the cluster controller can choose the node that runs the data VDM (its "active node"), and the cluster controller can also choose the backup node. The LUNs used by the data VDM can be attached to both the active node and the backup node, but the file systems can be mounted on the active node and not on the backup node. In an embodiment, the backup node can discover the LUNs at the Linux kernel level, but the backup node does not mount them. UFS64 does not support shared file systems as will be appreciated. If needed for load balancing, or because a chosen backup node has failed, the cluster controller can choose a different backup node for any data VDM.

When a node fails, each data VDM that was active on the failed node can be instead activated on its assigned backup node. After data service failover completes for all data VDMs affected by a node failure, the cluster controller can examine all the current data VDM backup node assignments to see if any backup nodes have failed. If so, the cluster controller can assign a different backup node to each such data VDM. The cluster controller can also attempt to restart any failed node. Note that information about which data VDM runs in which node is not persistent state of the node where it currently runs. This ensures that no confusion can result if that node fails and is subsequently restarted. The restarted node initially has no active data VDMs. Instead, the cluster controller can track where each data VDM is supposed to run, and which node is its backup node.

In order to ensure that exclusively-owned resources (such as file systems and IP addresses) are not accessed by multiple nodes, after detecting a failed node, failover processing can begin by fencing. Any node can optionally initiate fencing via a fence launcher block such as 506. Fencing can include, e.g., forcing the failed node to be off. This ensures data integrity in "split brain" scenarios, for example. While "split brain" should not happen unless there are multiple faults, data integrity should be maintained even in those cases, which also makes the cluster controller multiple fault tolerant.

In some embodiments, fencing can be done by fence launcher block 506 instructing a centralized controller, such as a VMWARE® vCenter controller (or equivalent in SDNAS systems that do not use VMWARE®) to turn off the failed node. On a system employing VMWARE®, that is a "power down" operation of the guest. If a network partition occurs, it can be interpreted as a failure of all the nodes at the other end of the partition. Whichever part of the cluster 200 still can reach the vCenter controller can shut down the other nodes. To avoid errors, in some embodiments, requests can be serialized through a single queue, so that a request to power down a first node made by a second node can be ignored if the second node is currently powered down. In another embodiment, power down requests can be issued with a short delay that can be a function of the node index, so that overlapping shut down requests are less likely.

In an embodiment, both the cluster VDM and the data VDMs can operate on UFS64 type file systems. The cluster VDM file system contains the cluster configuration databases, while a data VDM has a file system for configuration data as well as file systems that it exports to NAS clients. UFS64 can require that only one node at a time has a particular file system LUN mounted (whether read/write or read-only). Failure to enforce this can result in data corruption. In addition, data VDMs can have IP addresses, and when failover activates a data VDM at another node, the IP address can be enabled at that node. To avoid duplicate address conditions, the IP address can be disabled at the original node.

For storage fencing, a possible implementation can use small computer system interface (SCSI) persistent reservation to block access to the logical disk 250 after failover has occurred. Alternatively, to ensure IP address fencing, implementations can use a VMWARE® vCenter controller (or an equivalent in SDNAS implementations that do not use VMWARE®) to turn off a failed node early in the failover sequence. A fencing request (node shutdown) can be issued by each node that identifies a node failure. Since shutdown is idempotent, multiple redundant shutdown requests for a node need not lead to any unwanted side effects. While aspects of this description are in terms of a VMWARE® setup with vCenter to deliver fencing services, it will be appreciated that other approaches are also possible.

In another fencing aspect, after a fencing request has completed, embodiments can disallow storage operations from the targeted (fenced) node to execute on any LUN, until that fenced node is explicitly restarted (re-enabled) by the cluster controller. In another fencing aspect, after a fencing request has completed, the targeted (fenced) node can no longer respond to IP addresses of the cluster VDM and of any data VDMs that were previously active at that node.

Further to the node heartbeat mechanism disclosed herein, data service failover can depend on a heartbeat mechanism to detect the failure of a node. This is done by having each node report periodically that it is alive, via a communication channel visible to the other nodes. The communication channel used can comprise, e.g., a network connection such as a TCP/SSL connection. For a network based heartbeat, failover times of a few seconds are readily achieved. This can entail using L2 switches with a rapid spanning tree protocol enabled.

Heartbeats can be generated repetitively, and in some embodiments, periodically. A node can be treated as failed if one or more consecutive heartbeats are missed, for example, in an embodiment, a node can be treated as failed if two consecutive heartbeats are missed. However, that does not necessarily mean the node timeout is three times the heartbeat interval, because embodiments can also account for interruptions in the communication mechanism used due to fault tolerance handling.

With regard to network based heartbeats for data service failover, at startup, each node can open a TCP connection to every other node for the network heartbeat protocol. In an embodiment, the connection management machinery can ensure that there is exactly one connection to any peer node, as opposed to, e.g., one connection per source/destination IP address pair. After connection establishment, the peer node state becomes "reachable". From then on, heartbeat messages can be transmitted every heartbeat interval, e.g., every second. The heartbeat data can comprise, e.g., a node identifier and a current time. A heartbeat message can be expected from each peer node on its connection at least every timeout interval, e.g., every five seconds, which is three times the send interval plus two seconds allowance for network fault tolerance response time. Failure of the connection or timeout of heartbeat receipt can imply node failure. At this point, the connection can be closed and an attempt to reconnect can be made. If that reconnect is unsuccessful after an additional reconnect time interval, e.g., three seconds, the peer node state can transition to "unreachable". If so, reconnect attempts can continue, with a constant interval between retries. This means that a "node unreachable" event can occur, e.g., eight seconds after the failure of a node or the partitioning of the network between nodes.

In an example implementation, heartbeat notifications can comprise unidirectional messages. Network based heartbeats can deliver heartbeat notifications to peer nodes with latency not exceeding a latency limit, e.g., two seconds, even if a network fault recovery occurred.

In example operations of a cluster VDM, the cluster VDM can be active in a node elected to provide the cluster controller function, which we call the cluster node. The cluster VDM can deliver the cluster controller functions. The cluster VDM is similar to a system VDM in that it can own a file system—its root file system, which stores the database it manages. The difference from the system VDM is in which databases it manages and which algorithms it executes.

The cluster VDM can be started by the system VDM when the cluster node is elected, and the cluster VDM can be stopped when a different node is elected. There can be a single instance of the root file system for the cluster VDM in an SDNAS cluster. The LUN for this file system (the cluster LUN) can be attached to all nodes, but at any given time, one node can run the cluster VDM and that node has the file system mounted.

The cluster VDM can also own an IP address, which is interpreted as the address of the SDNAS cluster. Operations and maintenance (O&M) requests can be sent to this address. Requests for other cluster-wide services can also be sent here. Since VDM startup is fast, embodiments can optionally start and stop the cluster VDM as needed, rather than having cluster VDM instances running at every node but transitioning them between active and standby states.

As part of managing execution of data VDMs and balancing the workload, the cluster controller can select, for each active data VDM, its current active node (where it currently runs) and its backup node. The backup node can be a node that is operational, is different from the active node, and can be chosen so that the total number of assignments to any given node (active and backup) is within any applicable scale limits. For example, in a two node cluster, a normal per-node load can comprise half of a specified limit for a node, to allow one node to carry the load of the other node, if the other node fails.

In some embodiments, the cluster node can attach the LUNs of a data VDM to both the active and the backup nodes. The cluster node can notify the backup node of the data VDMs for which it is backup node, and the current active node assignments for each of these. Those current active nodes are the nodes that the backup node can monitor.

The backup node can perform preparation operations before actual failover. In particular, the backup node can have a Linux kernel discover the LUNs for which it is backup node, and the backup node can configure these in SDNAS. But the backup node does not start data VDMs or do any file system mounts, since file systems cannot be shared.

When a node down event is delivered, indicating that the network heartbeat mechanism has detected that a node has become unreachable, and that node is a monitored node, failover can be initiated for the data VDMs affected by the node failure. First, a fencing request can be sent to force the failed node to be off. Next, each of the affected data VDMs can be started. These two steps can be time critical and therefore can be optimized.

When the cluster controller receives a node down notification, it can update data VDM database entries for the data VDMs affected by that failure. In an embodiment, any data VDM that had the failed node as current active node can be updated to list the backup node as the new current active node, and the failed node as backup node (the two values can be interchanged).

The cluster controller can then wait for data service failover to complete for data VDMs affected by that node failure. Once that has completed, the cluster controller can request restart of the failed node. Once restarted, the restarted node has no active data VDMs. At that point, the cluster controller can notify the restarted node of the data VDMs for which it is currently backup node. That set can optionally include the data VDMs for which the restarted node was backup before, and the data VDMs for which it previously was current (active) node.

If a node remains down for too long in spite of attempts to restart it, any backup node assignments for that node can be reassigned to another operational node. The above is based on the assumption that restarting a node is fairly quick, while reassigning many LUNs to other nodes as part of changing backup node assignments takes more time. In products where LUN assignment is fast and restart is slow, the cluster controller can be changed to make backup reassignment its first action, and node restart can be a subsequent action. The goal can be to return to having a functional backup node for each data VDM promptly, thereby protecting against two failures occurring in close succession. If a node fails that has no data VDMs, it can be simply restarted by the cluster controller.

The cluster controller can change backup node assignments from time to time. For example, if load balancing changes current node assignments of data VDMs, the total assignments (active and backup) can become unbalanced. Changing the backup node assignments of a data VDM is similar to the assignment of a new backup node to a data VDM whose backup node has failed, except that the old backup node can be notified to remove the resources, such as Linux and SDNAS device entries, that it had created as preparation for failover, and also to have it update its list of active nodes to monitor.

Managing execution of data VDMs by the cluster controller can be thought of as the maintaining of the following invariants: first each enabled data VDM should be running on an operational node (its "active node"), and second, each enabled data VDM should have an operational backup node, distinct from its active node. The cluster controller can be responsible for taking action to maintain these invariants, wherein having an operational current node can be more critical.

For example, if multiple faults occur such that for some data VDMs, both active and backup nodes are down, this means those data VDMs are down, and the cluster controller can promptly pick some other node to be the active node, activate the data VDM there, and then assign a backup node for the data VDM. It is possible this cannot be done for all data VDMs affected, if the numbers involved are such that the remaining nodes cannot run all the enabled data VDMs. If so, the cluster controller can choose which data VDMs to leave down according to a selection rule such as a service level agreement rule or a quality of service rule associated with VDMs.

Figure 7:
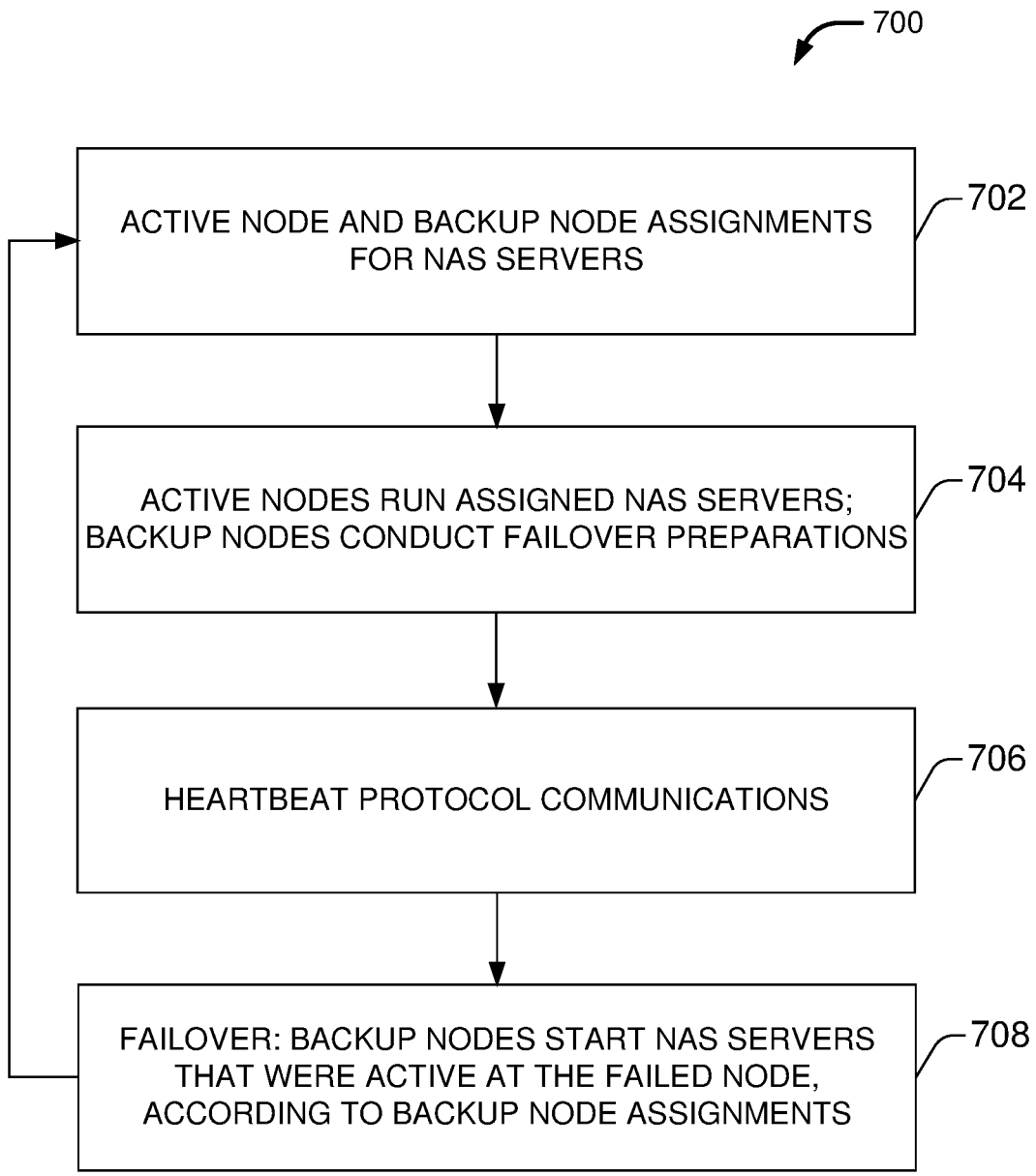
FIG. 7 is a diagram of an example, non-limiting computer implemented method that implements operations of a storage cluster, in accordance with one or more embodiments described herein.

FIG. 7 is a diagram of an example, non-limiting computer implemented method that implements storage cluster, in accordance with one or more embodiments described herein. The blocks of the illustrated method 700 represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

FIG. 7 provides a general view of operations of a storage cluster according to this disclosure. At block 702, a cluster controller can make active node and backup node assignments for NAS servers. At block 704, active nodes can run assigned NAS servers, and backup nodes can conduct failover preparations for starting NAS servers according to their backup node assignments, as described herein. At block 706, the nodes of the storage cluster can then engage in heartbeat protocol communications as described herein. The heartbeat protocol communications serve to detect node failures. Absent any node failure, the nodes can continue heartbeat protocol communications indefinitely. In the event of a node failure detected using the heartbeat protocol communications, nodes can conduct failover operations at block 708: backup nodes can start NAS servers that were active at the failed node, according to backup node assignments. A return arrow to block 708 illustrates that after failover, the cluster controller can adjust active node and backup node assignments for NAS servers, to accommodate any failed or restarted nodes, and to accommodate backup nodes which started active NAS servers pursuant to their backup node assignments.

Figure 8:
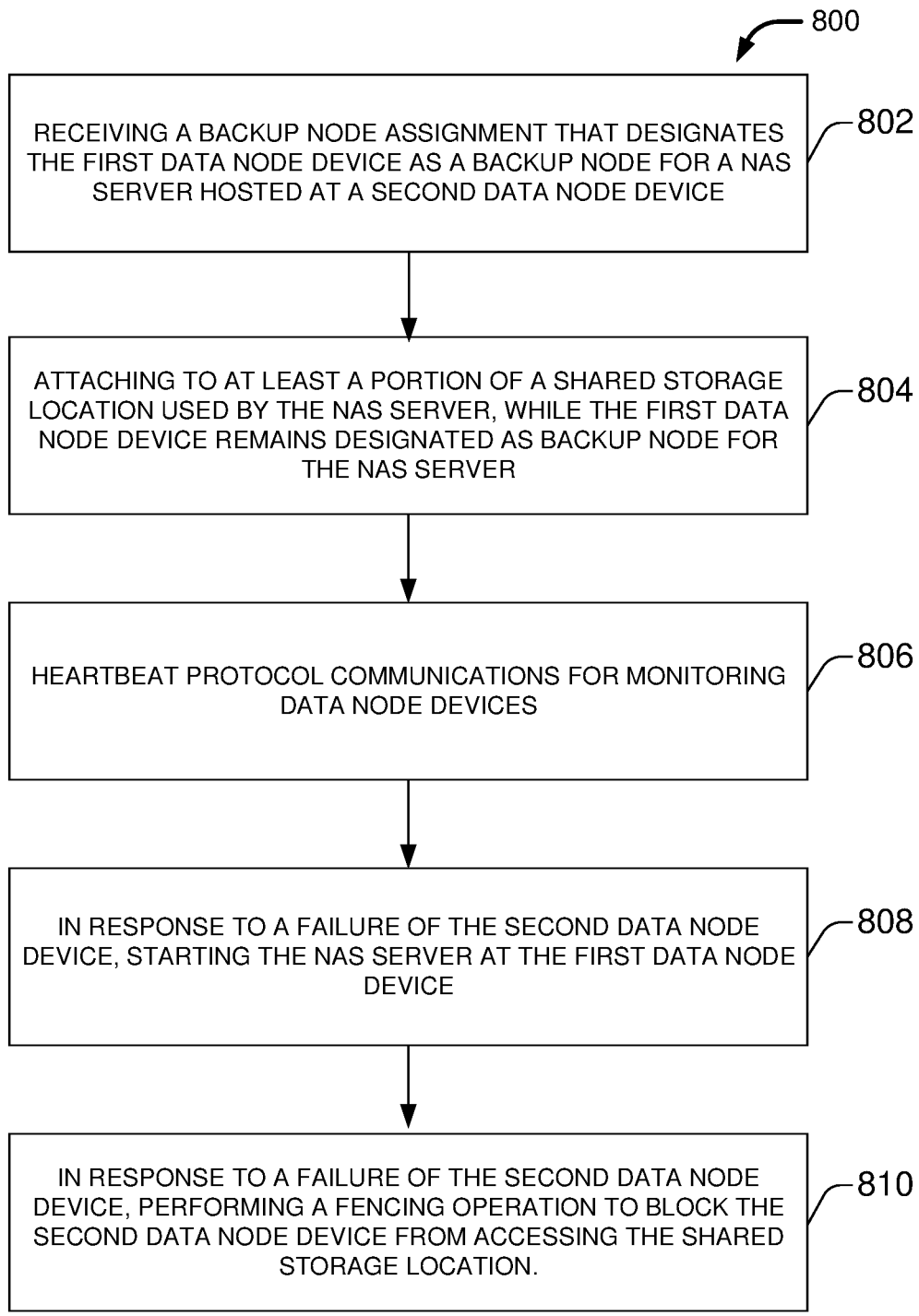
FIG. 8 is a diagram of an example, non-limiting computer implemented method that implements operations of a backup node, in accordance with one or more embodiments described herein.

FIG. 8 is a diagram of an example, non-limiting computer implemented method that implements operations of a backup node, in accordance with one or more embodiments described herein. The blocks of the illustrated method 800 represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

Embodiments of this disclosure can comprise multiple nodes, any of which can simultaneously serve as an active node for some NAS servers and a backup node for other NAS servers. It is also possible that any given node may occasionally serve in an active node role and not a backup node role, or vice versa. Thus, the operations illustrated in FIG. 8 illustrate options of any node, and some of the operations are specific to the backup node role as will be appreciated. FIG. 8 refers to a first data node device which provides a backup node for a NAS server hosted at a second data node device.

Block 802 depicts receiving a backup node assignment that designates the first data node device as a backup node for a NAS server hosted at a second data node device. For example, with reference to FIG. 2, a first node 220 can receive a backup node assignment 211B from the cluster controller 247, which assigns node 220 as backup node for NAS server 211A hosted at second node 210.

Block 804 depicts attaching to at least a portion of a shared storage location used by the NAS server, while the first data node device remains designated as backup node for the NAS server. For example, with reference to FIG. 2, first node 220 can attach to at least a portion of a shared storage location 250, while the first node 220 remains designated as backup node for the NAS server 211A.

Block 806 depicts heartbeat protocol communications for monitoring data node devices. For example, with reference to FIG. 2, first node 220 can engage in heartbeat protocol communications by sending heartbeat messages 272 to the other nodes 210, 230, and 240, and receiving heartbeat messages 271, 273, 274 from the other nodes 210, 230, and 240. First node 220 thereby monitors the second node 210 which hosts the NAS server 211A for which first node 220 serves as backup node.

Block 808 depicts, in response to a failure of the second data node device, starting the NAS server at the first data node device. For example, with reference to FIG. 3, first node 220 can detect the failure of the second node 210 by failure of second node 210 to participate in heartbeat protocol communications. First node 220 can responsively lookup any NAS servers for which second node 210 was the active node, and for which first node 220 is the backup node.

First node 220 can start these NAS servers, e.g., NAS server 211A, at first node 220, leveraging the preparation operations from block 804, such as the attaching to shared storage location 250 performed at block 804. First node 220 can continue using the portion of the shared storage location 250 which was attached at block 804. To start a NAS server, first node 220 can take actions such as mounting a filesystem for the shared storage location 250 and enabling an IP address to the NAS server at the first node 220.

Block 810 depicts, in response to a failure of the second data node device, performing a fencing operation to block the second data node device from accessing the shared storage location. For example, with reference to FIG. 3, in response to a failure of the second node 210, first node 220 can perform a fencing operation as described herein to block the second node 810 from accessing the shared storage location 250.

Figure 9:
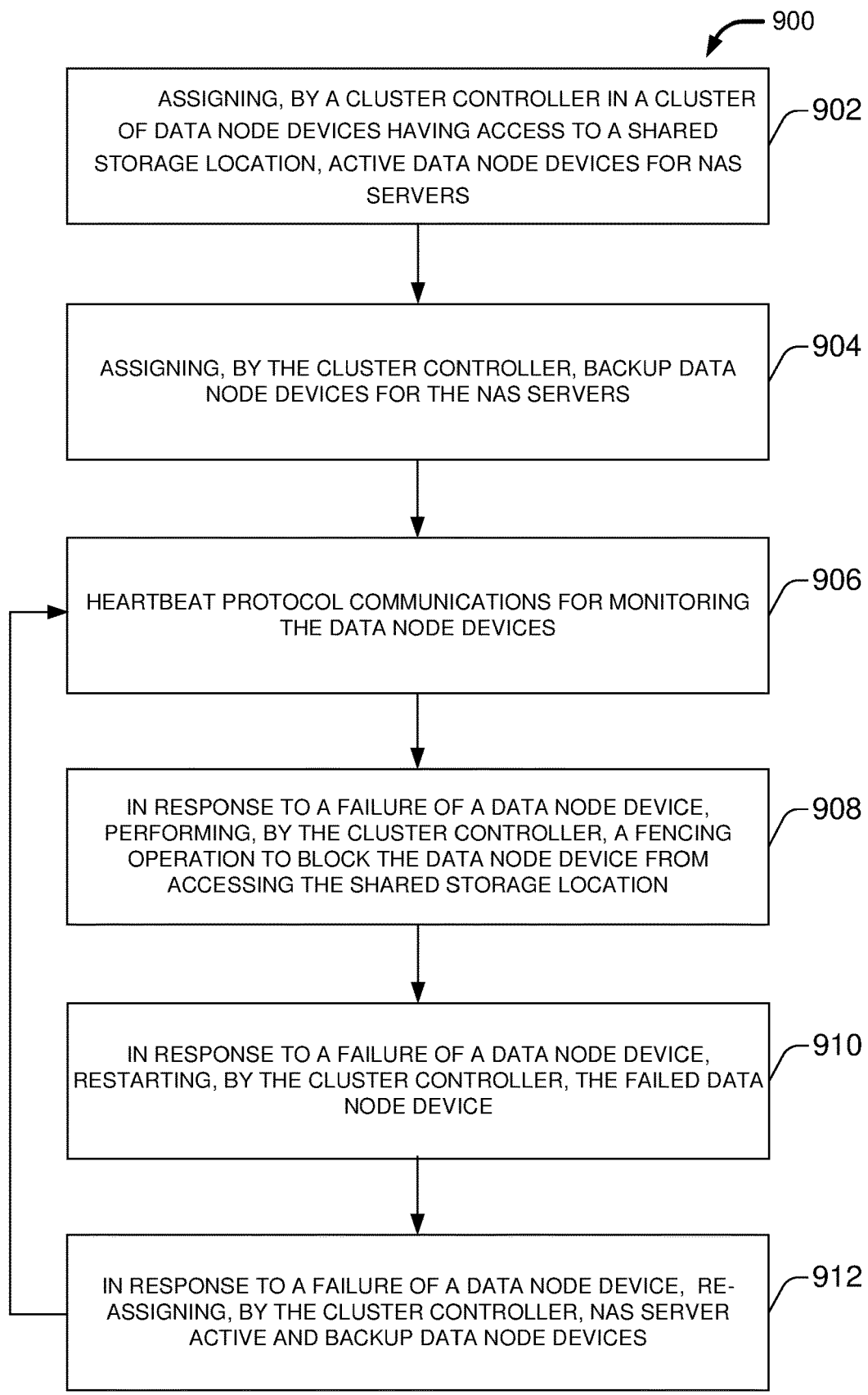
FIG. 9 is a diagram of an example, non-limiting computer implemented method that implements operations of a cluster controller, in accordance with one or more embodiments described herein.

FIG. 9 is a diagram of an example, non-limiting computer implemented method that implements operations of a cluster controller, in accordance with one or more embodiments described herein. The blocks of the illustrated method 900 represent operations according to a method, components in a computing device, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In general, with regard to FIG. 9, embodiments can be configured such that a cluster controller can execute at any of multiple different nodes of the storage cluster. The cluster controller can perform management operations as desired to administer the shared storage and the other nodes. As part of its management operations, the cluster controller can distribute NAS server assignments, also referred to as active node assignments, among the nodes of the cluster, and the cluster controller can also distribute backup node assignments among the nodes of the cluster. The backup nodes can then restart NAS servers from a failed node in distributed fashion, without relying on management from the cluster controller. The cluster controller can redistribute active node assignments and backup node assignments after a node failure.

Block 902 depicts assigning, by a cluster controller in a cluster of data node devices having access to a shared storage location, active data node devices for NAS servers. For example, with reference to FIG. 2, cluster controller 247 can assign active node 210 for NAS servers 211A, 212A, and 213A; cluster controller 247 can assign active node 220 for NAS servers 221A, 222A, and 223A; cluster controller 247 can assign active node 230 for NAS servers 231A, 232A, and 233A; and cluster controller 247 can assign active node 240 for NAS servers 241A, 242A, and 243A.

Block 904 depicts assigning, by the cluster controller, backup data node devices for the NAS servers. For example, with reference to FIG. 2, cluster controller 247 can assign backup node 210 for NAS servers 221B, 231B, and 241B; cluster controller 247 can assign backup node 220 for NAS servers 211B, 232B, and 242B; cluster controller 247 can assign backup node 230 for NAS servers 212B, 222B, and 243B; and cluster controller 247 can assign backup node 240 for NAS servers 213B, 223B, and 233B.

From the perspective of an individual first NAS server 211A, blocks 902 and 904 can assign a first data node device, e.g., node 220 to serve as a backup node for the first NAS server 211A, and a second data node device, e.g., node 210, to serve as active node for the first NAS server 211A. The first NAS server 211A, at the second node 210, attaches to the shared storage location 250 and mounts a filesystem for the shared storage location 250 (or the portion of shared storage location 250 used by NAS server 211A), while the first node 220 attaches to the shared storage location 250 and does not mount the filesystem for the shared storage location 250 (or the portion of shared storage location 250 used by NAS server 211A).

Block 906 depicts heartbeat protocol communications for monitoring the data node devices. For example, with reference to FIG. 2, node 240, which hosts cluster controller 247, can monitor heartbeat protocol communications of the other nodes 210, 220, and 230. If a node stops its heartbeat communications, cluster controller 247 can initiate its failover operations 908, 910, and 912, after which cluster controller 247 can return to normal, non-failover heartbeat protocol operations at block 906.

Block 908 depicts, in response to a failure of a data node device, performing, by the cluster controller, a fencing operation to block the data node device from accessing the shared storage location. For example, with reference to FIG. 3, in response to a failure of a node 210, cluster controller 247 can perform a fencing operation to block the node 210 from accessing the shared storage location 250.

Block 910 depicts, in response to a failure of a data node device, restarting, by the cluster controller, the failed data node device. For example, with reference to FIG. 3, in response to a failure of node 210, cluster controller 247 can restart the node 210. However, for at least some period of time after node 210 failure, a state such as illustrated in FIG. 4 can arise, in which the storage cluster 200 restores operation of the NAS servers 211A, 212A, 213A at other nodes 220, 230, 240.

Block 912 depicts, in response to a failure of a data node device, re-assigning, by the cluster controller, NAS server active and backup data node devices. For example, with reference to FIG. 4, in response to a failure of node 210, cluster controller 247 can re-assign active nodes for NAS servers 211A, 212A, and 213A, thereby reflecting the transfer of NAS servers 211A, 212A, and 213A to nodes 220, 230 and 240. Cluster controller 247 can also re-assign backup node assignments 211B, 212B, and 213B, as well as backup node assignments 221A, 231A, and 241A. Furthermore, cluster controller 247 can undertake further re-assignments after node 210 is restarted.

Figure 10:
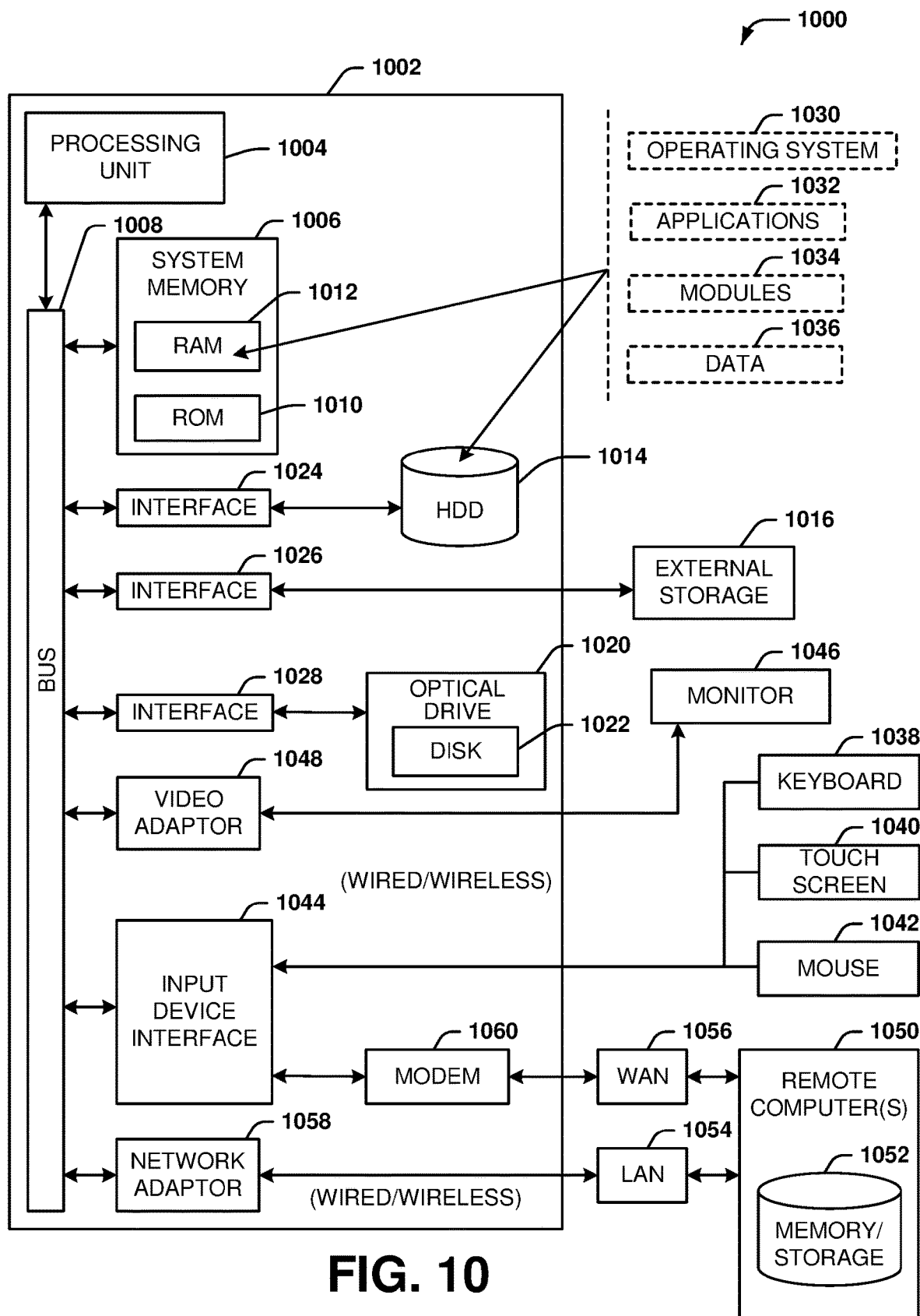
FIG. 10 illustrates a block diagram of an example computer operable to provide a data node device in a storage cluster as described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A first data node device, comprising:
at least one processor; and
at least one memory that stores executable instructions that, when executed by the at least one processor, facilitate performance of operations, comprising:
receiving a backup node assignment that designates the first data node device as a backup node for a storage server, wherein the storage server is initially hosted at a second data node device,
wherein the first data node device and the second data node device are in a cluster of data node devices having access to a shared storage location, and wherein the storage server uses at least a portion of the shared storage location;
while the first data node device remains designated as the backup node for the storage server, attaching the first data node device to the portion of the shared storage location used by the storage server;
monitoring the second data node device; and
in response to a failure of the second data node device, starting the storage server, wherein the storage server continues using the portion of the shared storage location.

2. The first data node device of claim 1, wherein monitoring the second data node device comprises monitoring a periodic output of the second data node device.

3. The first data node device of claim 2, wherein the failure of the second data node device comprises a failure to generate the periodic output within a timeout period.

4. The first data node device of claim 1, wherein the starting the storage server comprises mounting a filesystem for the portion of the shared storage location.

5. The first data node device of claim 1, wherein starting the storage server comprises assigning an internet protocol address to the storage server.

6. The first data node device of claim 1, wherein the backup node assignment is received from a cluster controller that administers the shared storage location.

7. The first data node device of claim 1, further comprising, in response to the failure of the second data node device, performing a fencing operation to block the second data node device from accessing the shared storage location.

8. A non-transitory machine-readable medium, comprising executable instructions that, when executed by a processor, facilitate performance of operations, comprising:
assigning, by a cluster controller in a cluster of data node devices having access to a shared storage location, a first data node device to serve as a backup node for a first network attached storage server;
assigning, by the cluster controller, the first network attached storage server to a second data node device;
configuring, by the cluster controller, the first network attached storage server to attach to the shared storage location and mount a filesystem for the shared storage location;
configuring, by the cluster controller, the first data node device to attach to the shared storage location without mounting the filesystem for the shared storage location; and
configuring, by the cluster controller, the first data node device to monitor the second data node device and to start the first network attached storage server at the first data node device in response to a failure of the second data node device.

9. The non-transitory machine-readable medium of claim 8, further comprising distributing, by the cluster controller, multiple network attached storage server assignments among multiple data node devices in the cluster of data node devices, and distributing, by the cluster controller, multiple backup node assignments among the multiple data node devices, wherein respective backup node assignments of the multiple backup node assignments correspond to respective network attached storage server assignments of the multiple network attached storage server assignments.

10. The non-transitory machine-readable medium of claim 9, wherein two or more of the multiple backup node assignments distributed by the cluster controller are assigned to different data node devices of the multiple data node devices, and wherein the two or more of the multiple backup node assignments correspond to network attached storage server assignments which designate a single data node device of the multiple data node devices.

11. The non-transitory machine-readable medium of claim 8, further comprising assigning, by the cluster controller, at least one second network attached storage server to the first data node device, and assigning, by the cluster controller, the second data node device to serve as a backup node for at least one third network attached storage server.

12. The non-transitory machine-readable medium of claim 8, further comprising, in response to the failure of the second data node device resulting in the second data node device becoming unavailable to serve as backup node for one or more network attached storage servers, assigning, by the cluster controller, data node devices to serve as a backup nodes for the one or more network attached storage servers.

13. The non-transitory machine-readable medium of claim 8, wherein the shared storage location comprises a logical storage.

14. The non-transitory machine-readable medium of claim 8, further comprising restarting, by the cluster controller, the second data node device in response to the failure of the second data node device.

15. A method, comprising:
distributing, by a cluster controller device in a cluster of data node devices having access to a shared storage location, multiple network attached storage server assignments among the data node devices;
distributing, by the cluster controller device, multiple backup node assignments among the data node devices, wherein respective backup node assignments correspond to respective network attached storage server assignments;
configuring, by the cluster controller device, data node devices assigned as backup nodes to attach to the shared storage location, wherein respective backup nodes monitor respective data node devices that host corresponding respective network attached storage servers; and
configuring, by the cluster controller device, data node devices to respond to a failure of a data node device of the data node devices, wherein respective data node devices designated as backup nodes for affected network attached storage servers hosted at the data node device, start respective network attached storage servers of the affected network attached storage servers.

16. The method of claim 15, wherein the respective data node devices designated as backup nodes for affected network attached storage servers start the respective network attached storage servers of the affected network attached storage servers at least in part by mounting respective filesystems for the shared storage location, and assigning respective internet protocol addresses to the affected network attached storage servers.

17. The method of claim 15, wherein the respective backup nodes monitor the respective data node devices that host corresponding respective network attached storage servers by monitoring periodic outputs thereof, and wherein the failure of the data node device of the data node devices comprises a failure to generate a periodic output of the periodic outputs within a timeout period.

18. The method of claim 17, wherein the timeout period is determined at least in part as a multiple of a period used for the periodic outputs.

19. The method of claim 15, wherein, in response to the failure of the data node device of the data node devices, one or more of the data node devices performs a fencing operation to block the data node device of the data node devices from accessing the shared storage location.

20. The method of claim 15, further comprising, in response to the failure of the data node device of the data node devices:
- restarting, by the cluster controller, the data node device of the data node devices;
- re-distributing, by the cluster controller device, at least one of the multiple network attached storage server assignments; and
- re-distributing, by the cluster controller device, at least one of the multiple backup node assignments.

* * * * *